United States Patent
Nishida et al.

(10) Patent No.: US 8,132,481 B2
(45) Date of Patent: Mar. 13, 2012

(54) PARALLEL MECHANISM

(75) Inventors: Tatsuhiko Nishida, Kyoto (JP); Hideaki Nakanishi, Kyoto (JP); Takashi Nakao, Kyoto (JP); Manabu Yamashita, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 447 days.

(21) Appl. No.: 12/416,235

(22) Filed: Apr. 1, 2009

(65) Prior Publication Data

US 2009/0255363 A1 Oct. 15, 2009

(30) Foreign Application Priority Data

Apr. 10, 2008 (JP) .................. 2008-102969

(51) Int. Cl.
 *B25J 18/04* (2006.01)
 *B66C 1/00* (2006.01)
(52) U.S. Cl. .................... 74/490.01; 414/735
(58) Field of Classification Search .. 74/490.01–490.06; 414/735; 901/2, 27–29; 403/192, 202–206; 700/258, 245, 255, 250

See application file for complete search history.

(56) References Cited

U.S. PATENT DOCUMENTS

| | | | |
|---|---|---|---|
| 4,679,957 A * | 7/1987 | Bauer | 403/27 |
| 5,003,136 A * | 3/1991 | Valenzona | 200/61.62 |
| 5,333,514 A | 8/1994 | Toyama et al. | |
| 5,712,478 A * | 1/1998 | Olsson | 250/231.13 |
| 6,543,987 B2 | 4/2003 | Ehrat | |
| 7,395,136 B2 * | 7/2008 | Osten | 700/258 |
| 2006/0182602 A1 | 8/2006 | Schuler et al. | |

FOREIGN PATENT DOCUMENTS

JP 11-048091 A 2/1999

OTHER PUBLICATIONS

Nishida et al., "Parallel Mechanism"; U.S. Appl. No. 12/468,155, filed May 19, 2009.
Nishida et al.; "Parallel Mechanism"; U.S. Appl. No. 12/416,241, filed Apr. 1, 2009.
Nishida et al., "Parallel Mechanism", U.S. Appl. No. 13/226,629, filed Sep. 7, 2011.

* cited by examiner

*Primary Examiner* — Robert Pezzuto
(74) *Attorney, Agent, or Firm* — Keating & Bennett, LLP (57) ABSTRACT

A parallel mechanism includes a base, actuators attached to the base, a plurality of arms coupled together in parallel, and a sensing device. Each of the arms has a first link, one end of which is coupled to the actuator, a second link through which the other end of the first link and a bracket are coupled together, a ball joint through which one end of the second link and the other end of the first link are swingably coupled together, and a ball joint through which the other end of the second link and the bracket are swingably coupled together. Each of the ball joints includes a ball stud including a ball-shaped head, a socket swingably holding the ball-shaped head of the ball stud, and a conductive member interposed between the ball-shaped head and the socket. The sensing device senses when at least one of the plurality of ball joints is loose, based on whether or not the ball stud and the socket are electrically continuous with one another.

20 Claims, 6 Drawing Sheets

PARALLEL MECHANISM

CROSS-REFERENCE TO RELATED APPLICATIONS

This application claims priority under 35 U.S.C. 119 to Japanese Patent Application No. 2008-102969, filed on Apr. 10, 2008, which application is hereby incorporated by reference in its entirety.

BACKGROUND OF THE INVENTION

1. Field of the Invention

The present invention relates to a parallel mechanism, and in particular, to a parallel mechanism including a pair of arms coupled together through a ball joint.

2. Description of Related Art

A parallel mechanism in which a base portion that includes a support base and a bracket with an end effector attached thereto are coupled together in parallel through a plurality of arms is known. That is, in the parallel mechanism, electric motors are arranged in parallel. Furthermore, a plurality of arms coupled to the respective motors ultimately operate one bracket.

In each arm, a ball and a socket provided in a ball joint are held by the tensile force of a spring. However, one half side of the ball of the ball joint is exposed from the socket. Thus, when the ball joint is subjected to a load exceeding the tensile force of the spring, the ball may come loose from the socket. However, conventional techniques for arranging the parallel mechanism do not take into account sensing of possible loosening of the ball joint. Thus, even if the ball joint comes loose, the parallel mechanism continues to operate with no measures taken, that is, it continues to operate with the ball joint remaining loose. When the parallel mechanism continues to operate with the ball joint remaining loose, the arm or the like may be damaged. Thus, there has been an unmet demand to sense when the ball joint, through which the arms or the like are swingably coupled together, is loose.

SUMMARY OF THE INVENTION

Preferred embodiments of present invention have been made to solve the above problems and allow sensing of possible loosening of the ball joint, through which the arms or the like are swingably coupled together. Preferred embodiments of the present invention will be described below.

A preferred embodiment of the present invention provides a parallel mechanism including a plurality of arms coupled together in parallel or substantially in parallel and each including a first link, one end of which is coupled to an actuator attached to a base portion, a second link through which the other end of the first link and a bracket are coupled together, a ball joint through which one end of the second link and the other end of the first link are swingably coupled together, and a ball joint through which the other end of the second link and the bracket are swingably coupled together, wherein the parallel mechanism includes a sensing device arranged to sense that at least one of the ball joints is loose, and each of the ball joints having a ball stud including a ball-shaped head, a socket swingably and pivotally movably holding the ball-shaped head of the ball stud, and a conductive member interposed between the ball-shaped head and the socket, and wherein the sensing device senses when any of the ball joints is loose, based on whether or not the ball stud and the socket are arranged such that they are electrically continuous.

According to a preferred embodiment of the present invention, a conductive member is interposed between the ball-shaped head of ball stud and the socket, and the ball stud and the socket define the ball joint. Thus, with the ball-shaped head of the ball stud held in the socket, the ball stud and the socket are electrically continuous through the conductive member. On the other hand, when the ball joint comes loose, that is, when the ball-shaped head of the ball stud comes loose from the socket, the ball stud and the socket become electrically discontinuous. Thus, a possible loosening of the ball joint can be sensed based on whether or not the ball stud and the socket are electrically continuous. This enables the sensing of possible loosening of the ball joint through which the one end of the second link and the other end of the first link are swingably coupled together and/or the ball joint through which the other end of the second link and the bracket are swingably coupled together.

In another preferred embodiment, the sensing device is arranged to sense when any of the ball joints are loose, based on whether or not a unit sensing circuit defined by the ball stud, the conductive member, and the socket is electrically continuous.

In this case, possible loosening can be sensed in each of the ball joints.

In a further preferred embodiment, the sensing device senses when any of the ball joints are loose, based on whether or not an assembled sensing circuit is electrically continuous in which a plurality of unit sensing circuits, each being defined by the ball stud, the conductive member, and the socket, are connected together in series.

Thus, the assembled sensing circuit becomes electrically discontinuous when at least one of the plurality of ball joints defining the plurality of unit sensing circuits included in the assembled sensing circuit comes loose. Consequently, possible loosening of the ball joints can be integrally sensed.

In a more preferred embodiment, the second link has paired rods. The ball joint through which the one end of the second link and the other end of the first link are coupled together and the ball joint through which the other end of the second link and the bracket are coupled together are provided in the respective paired rods as a pair. In the assembled sensing circuit, the unit sensing circuits each defined by the four ball joints provided in the second link are connected together in series.

In this case, the electric continuity of the assembled sensing circuit becomes electrically discontinuous when at least any one of the four ball joints provided in the paired rods of the second link comes loose. Thus, the sensing circuit can integrally sense when any of the four ball joints provided in the paired rods is loose.

Furthermore, the parallel mechanism preferably includes three arms, and the second link has paired rods. The ball joint through which the one end of the second link and the other end of the first link are coupled together and the ball joint through which the other end of the second link and the bracket are provided in paired rods, respectively, as a pair. In the assembled sensing circuit, the unit sensing circuits defined by the twelve ball joints provided in the three arms are connected together in series.

Thus, the assembled sensing circuit becomes electrically discontinuous when any one of the twelve ball joints used in the three arms defining the one parallel mechanism comes loose. Consequently, the sensing circuit can integrally sense when any of the twelve ball joints used in the three arms is loose.

In yet another preferred embodiment of the present invention, the sensing device determines that any of the ball joints is loose when the ball joint remains electrically discontinuous at least for a predetermined time.

Thus, even if instantaneous interruption or chattering occurs during operation of the parallel mechanism, possible erroneous sensing can be prevented.

In a more preferred embodiment of the present invention, the parallel mechanism includes a stop device arranged to stop a driving of the actuator when the sensing device determines that any of the ball joints is loose.

Thus, when any of the ball joints comes loose, the driving of the actuator is stopped. The parallel mechanism can thus be prevented from continuing to operate with the second link loose from the first link or the bracket.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Preferred embodiments of the present invention will be described below in detail with reference to the drawings. In the drawings, the same elements are denoted by the same reference numerals, and duplicate descriptions are omitted.

Figure 1:
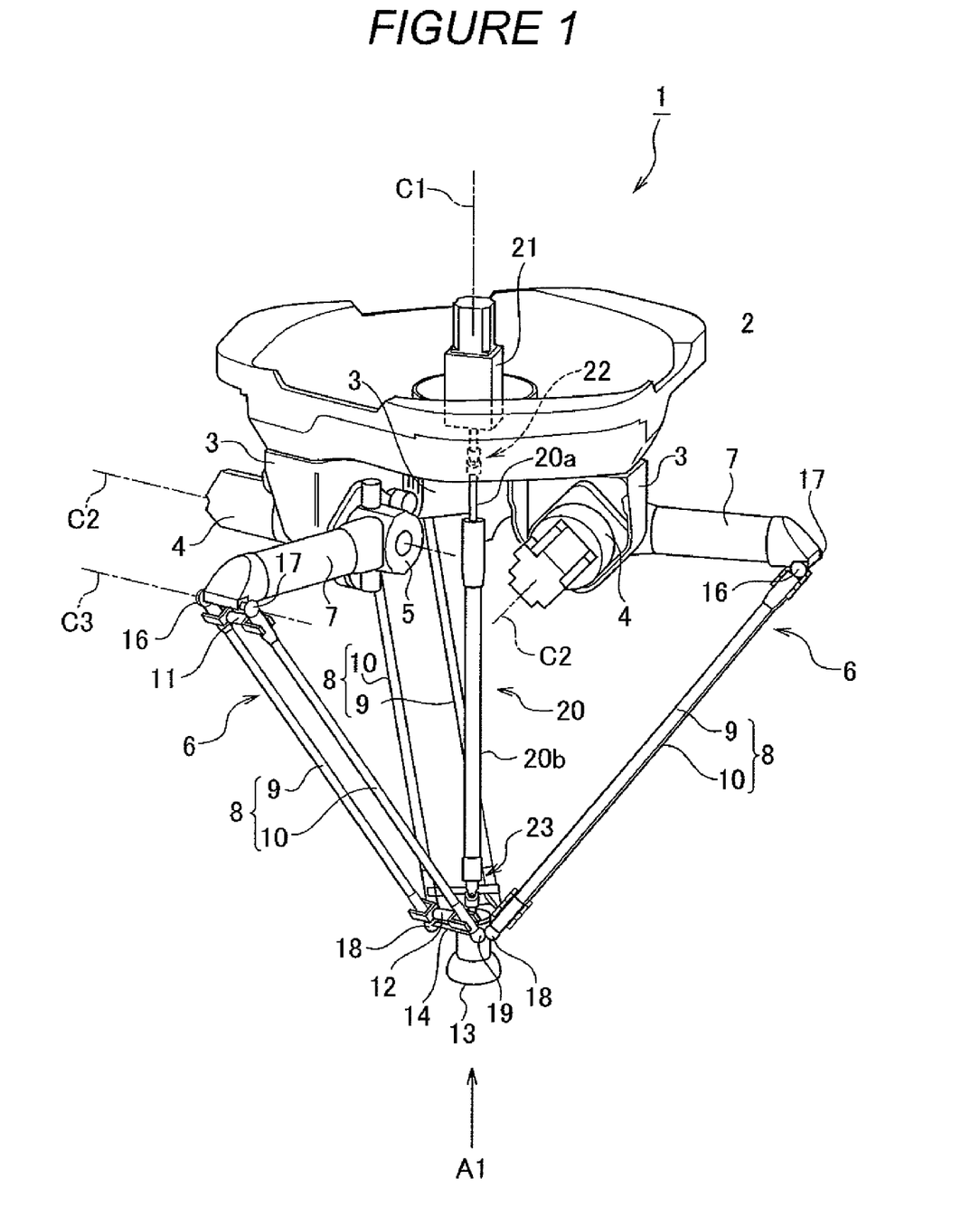
FIG. 1 is a perspective view showing the general configuration of a parallel mechanism according to a preferred embodiment of the present invention.
Figure 2:
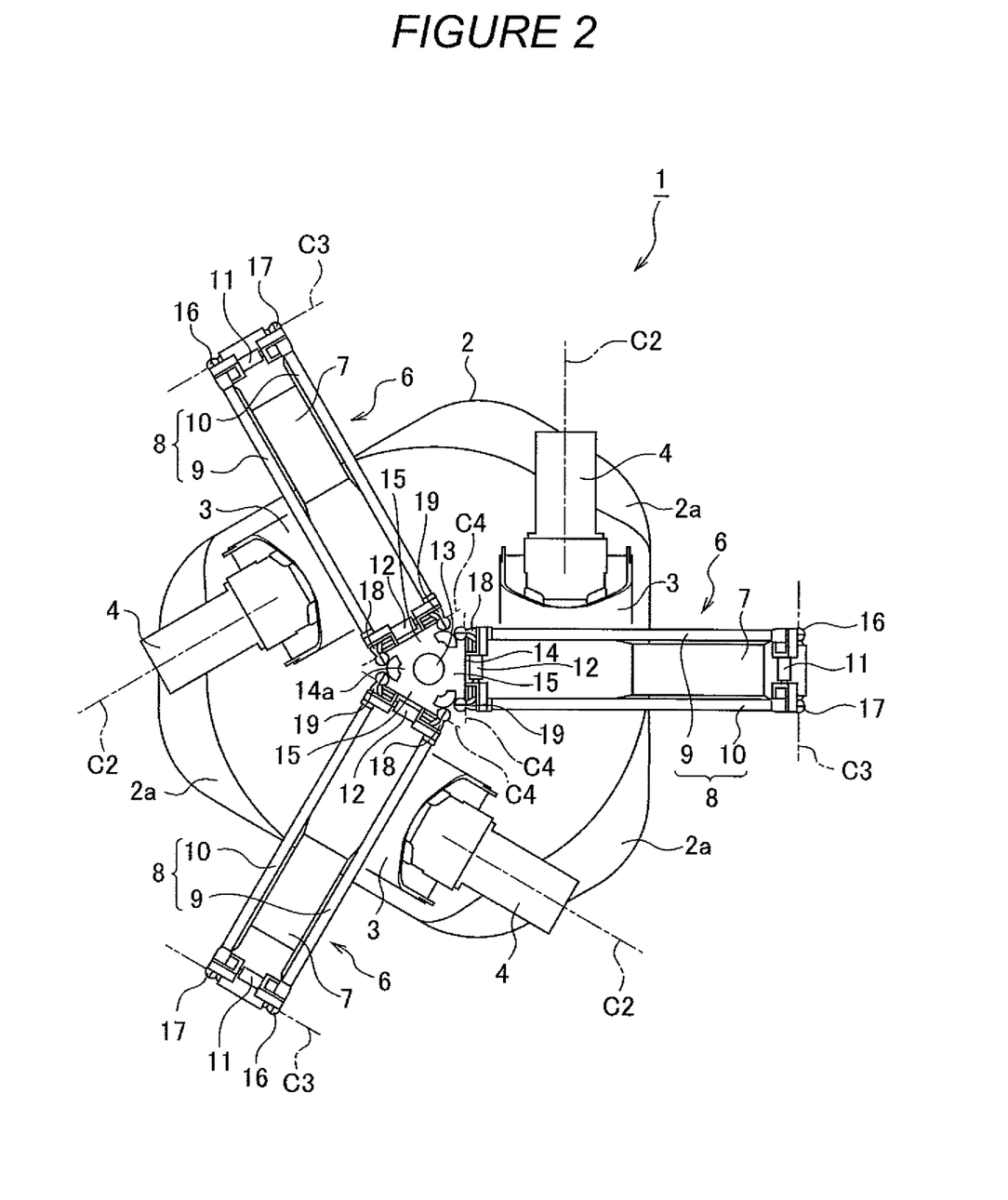
FIG. 2 is a diagram showing the parallel mechanism as viewed from the direction of arrow A1 in FIG. 1.

First, the general configuration of a parallel mechanism according to a preferred embodiment will be described with reference to FIGS. 1 and 2. FIG. 1 is a perspective view showing the general configuration of the parallel mechanism 1 according to a preferred embodiment of the present invention. FIG. 2 is a diagram showing the parallel mechanism 1 as viewed from the direction of arrow A1 in FIG. 1.

The parallel mechanism 1 has a base portion at the top thereof. The parallel mechanism 1 is supported by fixing a flat mounting surface 2a of the base portion 2 arranged on the bottom surface side thereof, to, for example, a flat ceiling. On the other hand, three support members 3 are provided on the bottom surface side of the base portion 2. An electric motor 4 is supported in each of the support members 3 as an actuator. The electric motor 4 is supported such that the axis C2 of a motor shaft is parallel or substantially parallel (that is, horizontal or substantially horizontal) to the mounting surface 2a of the base portion 2. The support members 3 are separated from one another by equal angles (about 120 degrees, for example) around the vertical axis C1 of the base portion 2. The electric motors 4 are also separated from one another by equal angles (about 120 degrees, for example) around the vertical axis C1 of the base portion 2 (see FIG. 2).

A substantially hexagonal cylindrical arm support member 5 is fixed to an output shaft of each of the electric motors 4 coaxially with the axis C2. The arm support member 5 is rotated around the axis C2 by driving the electric motor 4. Each of the electric motors 4 is connected to an electronic control device (not shown in the drawings; hereinafter also referred to as a "programmable logic controller (PLC)"). Rotation of the output shaft of the electric motor 4 is controlled by the electronic control device.

The parallel mechanism 1 preferably has three arm main bodies 6. Each of the arm main bodies 6 includes a first arm 7 and a second arm 8. Here, the first arm 7 corresponds to a first link. The second arm 8 corresponds to a second link. The first arm 7 is preferably an elongated, hollow cylindrical member formed of, for example, carbon fiber. The base end of the first arm 7 is attached to a side surface of the arm support member 5. The first arm 7 is fixed so that the axis of the first arm 7 is perpendicular or substantially perpendicular to the axis C2.

The base end of the second arm 8 is coupled to the free end of the first arm 7 so that the second arm 8 is swingable around the free end of the first arm 7. The second arm 8 preferably includes paired elongate rods 9, 10. The paired rods 9, 10 are arranged parallel or substantially parallel to each other in the longitudinal direction thereof. Each of the rods 9, 10 is also preferably an elongated, hollow cylindrical member formed of, for example, carbon fiber. The base ends of the rods 9, 10 are rotatably coupled to the free end of the first arm 7 through paired ball joints 16, 17. An axis C3 connecting the rotational centers of the ball joints 16, 17 at the base ends of the rods 9, 10 is located parallel or substantially parallel to the axis C2 of the electric motor 4.

Furthermore, at the base end of the second arm 8, the rod 9 and the other rod 10 are coupled together through a coupling member 11. At the free end of the second arm 8, the rod 9 and the other rod 10 are coupled together through a coupling member 12. Each of the coupling members 11, 12 has, for example, a tensile coil spring as a biasing member to bias the paired rods 9, 10 in a direction in which the paired rods 9, 10 pull each other. The coupling members 11, 12 may have different structures but preferably has the same structure in order to provide reduced costs. Each of the coupling members 11, 12 has the function of preventing the rods 9, 10 from rotating around respective axes parallel to the longitudinal direction of the rods 9, 10.

Furthermore, the parallel mechanism 1 has a bracket 14 to which an end effector portion (tool) 13 is pivotally movably attached. The bracket 14 is a substantially equilateral triangular, plate-shaped member. The bracket 14 is held by three arm main bodies 6 so that a mounting surface 14a (the bottom surface of the bracket 14 in FIG. 1) of the bracket 14 to which the end effector portion 13 is attached is parallel or substantially parallel (that is, horizontal) to the mounting surface 2a of the base portion 2.

A mounting piece 15 is arranged on each side of the bracket 14. The mounting piece 15 is coupled to the free end (the free ends of the pared rods 9, 10 defining the second arm 8) of the corresponding arm main body 6. The bracket 14 thus swings with respect to the corresponding arm main body 6 around the free end of the arm main body 6. Specifically, an end of each of the mounting pieces 15 of the bracket 14 is coupled to the free ends of the corresponding rods 9, 10 through paired ball joints 18, 19. An axis C4 (see FIG. 2) connecting the paired ball joints 18, 19 together is also parallel or substantially parallel to the axis C2 of each of the electric motors 4. Thus, the bracket 14 can swing with respect to each of the arm main bodies 6 around the horizontal axis C4. The substantially equilateral triangular bracket 14 is supported by the three arm main bodies 6 so as to be swingable at all the sides thereof around the horizontal axis C4.

The distance between the paired ball joints 16, 17, located at the coupling portions between the first arm 7 and the second arm 8, preferably is set equal to the distance between the paired ball joints 18, 19, located at the coupling portions between the bracket 14 and the rods 9, 10 of the second arm 8. Thus, as described above, the paired rods 9, 10 defining the second arm are arranged parallel or substantially parallel to each other all along the length thereof in the longitudinal direction. All of the axes C2, C3, and C4 are parallel or substantially parallel to the mounting surface 2a of the base portion 2. Thus, regardless of however the first arm 7, the second arm 8, and the bracket 14 swing around the axes C2, C3, and C4, respectively, the parallel or substantially parallel relationship is maintained between the mounting surface 14a of the bracket 14 to which the end effector portion 13 is attached and the mounting surface 2a of the base portion 2.

In response to instructions from the electronic control device, the rotating position of the arm support member 5 fixed to the output shaft of each of the electric motors 4 is controlled to control the position of the free end of the corresponding first arm 7. The position of the free end of each of the second arms 8 follows the controlled position of the free end of the corresponding first arm 7. This determines the position of the mounting surface 14a of the bracket 14 to which the end effector portion 13 is attached. At this time, as described above, the bracket 14 moves while maintaining the horizontal posture thereof.

Furthermore, the parallel mechanism 1 has a turning shaft rod 20 located in the center thereof and extending in the vertical direction, and an electric motor 21 that rotates the turning shaft rod 20. The electric motor 21 is fixed to the base portion 2 with an output shaft thereof directed downward in the vertical direction. One end of the turning shaft rod 20 is coupled to the output shaft of the electric motor 21 through a universal joint 22. On the other hand, the other end of the turning shaft rod 20 is connected to the end effector portion 13 through a universal joint 23. The turning shaft rod 20 is defined by a rod 20a and a cylinder 20b and configured to be telescopic. Since the universal joints 22, 23 are provided at the respective ends of the turning shaft rod 20, even though the bracket 14 is drivingly moved to a predetermined upward, downward, forward, backward, rightward, or leftward position by the three electric motors 4, the turning shaft rod 20 can move following the predetermined position. The electric motor 21 is also connected to the above-described electronic control device. Rotation of the output shaft of the electric motor 21 is controlled by the electronic control device to control the rotating position of the end effector portion 13.

Figure 3:
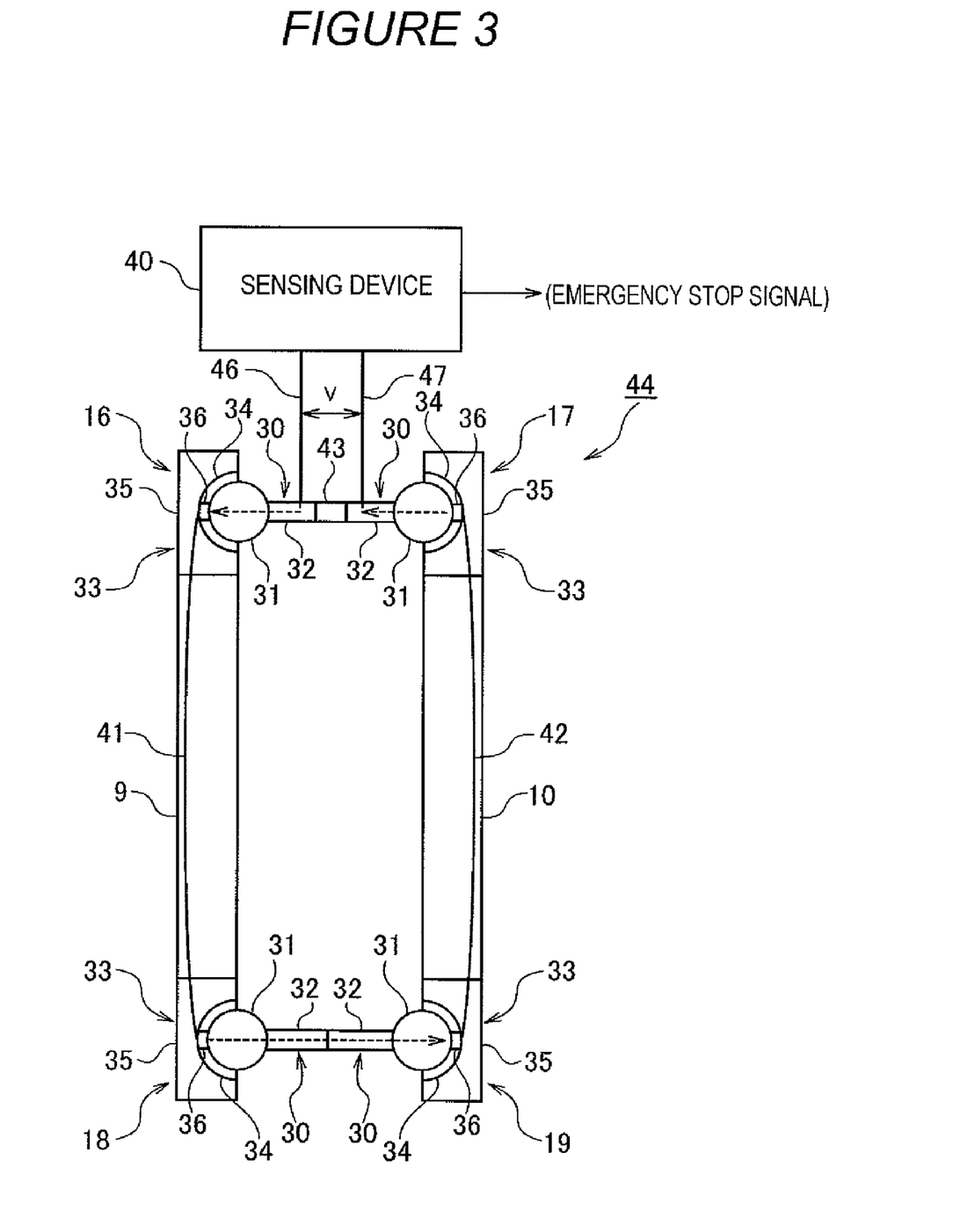
FIG. 3 is a schematic diagram showing an example of an assembled sensing circuit that integrally senses when any of ball joints used in each of arm main bodies defining the parallel mechanism is loose according to a preferred embodiment of the present invention.

Furthermore, the parallel mechanism 1 has a function of sensing when any of the ball joints 16, 17, 18, 19 of each of the three arm main bodies 6 are loose. Now, with reference to FIG. 3, an assembled sensing circuit and a sensing device which detect when any of the ball joints 16, 17, 18, 19 is loose. Here, FIG. 3 is a schematic diagram showing a preferred embodiment of an assembled sensing circuit that integrally senses when any of a total of four ball joints 16, 17, 18, 19 used in each arm main bodies 8 is loose. Since the assembled sensing circuits of the three arm main bodies 6 are identical, the assembled sensing circuit 44 of one arm main body 6 will be described below. The assembled sensing circuits 44 for the other arm main bodies 6 will not be described.

Each of the ball joints 16, 17, 18, 19 preferably has, for example, a steel ball stud 30, a metal rod 33 as a socket member, and a conductive member 36. The ball stud 30 has a ball-shaped head 31 located at a tip portion thereof and including an integrally formed spherical outer peripheral surface. Furthermore, a shaft portion 32 is integrally projected from the ball-shaped head 31 of the ball stud 30. On the other hand, the rod 33 includes a socket 35 located at one end thereof and in which a cup 34 is defined; the cup 34 is a semispherical recess portion with an inner peripheral surface corresponding substantially to the spherical outer peripheral surface of the ball-shaped head 31. The cup 34, defined in the socket 35, is configured to hold the ball-shaped head 31.

The conductive member 36 is interposed between the cup 34, formed in the socket 35, and the ball-shaped head 31 of the ball stud 30, held in the cup 34. The conductive member 36 is installed in contact with the ball-shaped head 31 and the cup 34. Thus, with the ball-shaped head 31 of the ball stud 30 held in the cup 34, defined in the socket 35, the ball stud 30 and the socket 35 are electrically continuous. Furthermore, when any of the ball joints 16, 17, 18, 19 is loose, that is, when the ball-shaped head 31 of the ball stud 30 is loose from the cup 34, defined in the socket 35, the ball stud 30 and the socket 35 are electrically discontinuous. Namely, the ball stud 30, the conductive member 36, and the socket 35 define a unit sensing circuit that senses when a corresponding one of the ball joints 16, 17, 18, 19 is loose.

The four unit sensing circuits are connected together in series to define the assembled sensing circuit 44 that integrally senses when any of the ball joints 16, 17, 18, 19 is loose. More specifically, the rod 33 of the ball joint 16 and the rod 33 of the ball joint 18 are electrically connected together through a first wiring material 41. The ball stud 30 (shaft portion 32) of the ball joint 18 and the ball stud 30 (shaft portion 32) of the ball joint 19 are coupled together. The rod 33 of the ball joint 16 and the rod 33 of the ball joint 17 are electrically connected together through a second wiring material 42. Thus, the assembled sensing circuit 44 including the four unit sensing circuits connected together in series is defined. Furthermore, the ball stud 30 (shaft portion 32) of the ball joint 16 and the ball stud 30 (shaft portion 32) of the ball joint 17 are coupled together through an insulator 43 in order to electrically insulate the shaft portions 32 of the upper ball joints 16, 17.

In the assembled sensing circuit 44, the four unit sensing circuits are connected together in series. Thus, electric continuity is established when all of the four ball joints 16, 17, 18, 19, provided in the rods 9, 10. The electric continuity is lost when at least any one of the ball joints 16, 17, 18, 19 comes loose (see FIG. 4). For example, a wiring material such as copper wires or pattern wiring can be suitably used as the first wiring material 41 and the second wiring material 42. However, the rods formed of a conductive raw material could also be used as a wiring material. The first wiring material 41 and the second wiring material 42 are preferably housed in the internal spaces of the hollow rods 9, 10. Thus, the first wiring material 41 and the second wiring material 42 are not exposed to the exterior. This prevents the first wiring material 41 and the second wiring material 42 from being caught on a frame or the like and inadvertently cut while the parallel mechanism 1 is in operation.

The assembled sensing circuit 44 is connected to a sensing device 40 that senses when any of the ball joints 16, 17, 18, 19 is loose, based on whether or not the assembled sensing circuit 44 is electrically continuous. More specifically, the ball stud 30 (shaft portions 32) of the ball joint 16 and the ball stud 30 (shaft portions 32) of the ball joint 17 are connected to respective input terminals of the sensing device 40 through a third wiring material 46 and a fourth wiring material 47. Alternatively, the following configuration is possible: the ball stud 30 of the ball joint 16 and the ball stud 30 of the ball joint 17 are coupled together, the first wiring material 41 is removed, and the ball stud 30 of the ball joint 16 and the ball stud 30 of the ball joint 18 are connected to the respective input terminals of the sensing device 40. Alternatively, the following configuration is possible: the ball stud 30 of the ball joint 16 and the ball stud 30 of the ball joint 17 are coupled together, the second wiring material 42 is removed, and the ball stud 30 of the ball joint 19 and the ball stud 30 of the ball joint 17 are connected to the respective input terminals of the sensing device 40. Alternatively, the following configuration is possible: the ball stud 30 of the ball joint 16 and the ball stud 30 of the ball joint 17 are coupled together, the ball stud 30 of the ball joint 18 and the ball stud 30 of the ball joint 19 are mechanically coupled together through the insulator 43, and the ball stud 30 of the ball joint 18 and the ball stud 30 of the ball joint 19 are connected to the respective input terminals of the sensing device 40. The third wiring material 45 and the fourth wiring material 47 are preferably housed in the internal space of the hollow first arm 7, for example. Thus, the third wiring material 46 and the fourth wiring material 47 are not exposed to the exterior. This prevents the third wiring material 46 or the fourth wiring material 47 from being caught on a frame or the like and inadvertently cut while the parallel mechanism 1 is in operation.

The sensing device 40 includes an input circuit, a signal processing circuit arranged to process signals input by the input circuit, and an output circuit that preferably outputs a driving/emergency stop signal to the programmable logic controller (an electronic control device), which drives the electric motor 4; the input device, the signal processing circuit, and the output circuit are defined of electronic components such as ICs, transistors, resistors, and capacitors. For example, the input circuit inputs a Lo (for example, 0 V) signal when the electric continuity is present. The input circuit inputs a Hi (for example, 5 V) signal to the signal processing circuit when the electric continuity is lost. The signal processing circuit includes a flip flop to hold the input signal. The signal processing circuit executes processes such as prevention of possible chattering of contacts, and outputs the processed signal to the output circuit. Furthermore, when the electric continuity continuously fails to be sensed for a predetermined time (for example, time required for one cycle of a reciprocating operation), the signal processing circuit outputs a signal indicating that the electric continuity is absent. When the electric continuity is lost, the output circuit preferably outputs the emergency stop signal to the programmable logic controller. That is, the sensing device 40 functions as both a sensing device and a stop device.

In the above-described configuration, when during operation of the parallel mechanism 1, at least any one of the ball joints 16, 17, 18, 19 defining the assembled sensing circuit 44 comes loose, the assembled sensing circuit 44 becomes electrically discontinuous. Thus, the sensing circuit 44 senses that any of the ball joints 16, 17, 18, 19 is loose. Then, the sensing device 40 outputs the emergency stop signal to the programmable logic controller. Driving of the electric motor 4 is thus stopped to stop the operation of the parallel mechanism 1. On the other hand, when none of the ball joints 16, 17, 18, 19 are loose, the assembled sensing circuit 44 is electrically continuous, and does not output the emergency stop signal. Thus, the electric motor 4 continues to be driven to allow the parallel mechanism 1 to operate.

According to the present preferred embodiment, the conductive member 36 is preferably interposed between the ball-shaped head 31 of the ball stud 30 and the socket 35; the ball stud 30 and the socket 35 define each of the ball joints 16, 17, 18, 19. Thus, with the ball-shaped head 31 of the ball stud 30 held in the socket 35, the ball stud 30 and the socket 35 are electrically continuous through the conductive member 36. On the other hand, when any of the ball joints 16, 17, 18, 19 comes loose, that is, when the ball-shaped head 31 of the ball stud 30 comes loose from the socket 35, the ball stud 30 and the socket 35 become electrically discontinuous. Thus, the present preferred embodiment allows possible loosening of any of the ball joints 16, 17, 18, 19 to be sensed based on whether or not the ball stud 30 and the socket 35 are electrically continuous. The present preferred embodiment therefore enables sensing of possible loosening of the ball joints 16, 17, through which one end of the second arm 8 and the other end of the first arm 7 are swingably coupled together, and the ball joints 18, 19, through a which the other end of the second arm 8 and the bracket 14 are swingably coupled together.

According to the present preferred embodiment, the four unit sensing circuits, which sense when the ball joints 16, 17, 18, 19, respectively, are loose, are connected together in series to define the assembled sensing circuit 44, which integrally senses when any of the ball joints 16, 17, 18, 19 is loose. Thus, when at least any one of the ball joints 16, 17, 18, 19, defining the assembled sensing circuit 44, comes loose, the assembled sensing circuit 44 becomes electrically discontinuous. Consequently, the assembled sensing circuit 44 can integrally sense when at least any one of the four ball joints 16, 17, 18, 19, provided in the paired rods 9, 10, making up the second arm 8 is loose.

According to the present preferred embodiment, when the assembled sensing circuit 44 is electrically discontinuous at least for the predetermined time, any of the ball joints 16, 17, 18, 19 is determined to be loose. Thus, even if instantaneous interruption or chattering occurs during operation of the parallel mechanism 1, possible erroneous sensing can be prevented.

Furthermore, according to the present preferred embodiment, when any of the ball joints 16, 17, 18, 19 comes loose, the driving of the electric motor 4 can be stopped.

The parallel mechanism 1 can thus be prevented from continuing to operate with the second arm 8 remaining loose from the first arm 7 or the bracket 14.

In the above-described assembled sensing circuit 44, possible loosening of any of the ball joints 16, 17, 18, 19 is sensed in any one of the arm main bodies 6 or in each of the arm main bodies 6. However, the three assembled sensing circuits 44, provided in the respective arm main bodies 6, may be connected together in series so as to integrally sense when any of a total of twelve ball joints 16 to 19 used in the three arm main bodies 6 (of the parallel mechanism 1) is loose (in a second wiring form). Thus, subsequently, with reference to FIG. 5, an assembled sensing circuit 44 will be described which integrally senses when any of the total of twelve ball joints 16, 17, 18, 19 used in the three arm main bodies 6 is loose. Here, FIG. 5 is a schematic diagram showing an example of an assembled sensing circuit that integrally senses when any of the total of twelve ball joints 16, 17, 18, 19 used in the three arm main bodies 6 is loose.

Figure 5:
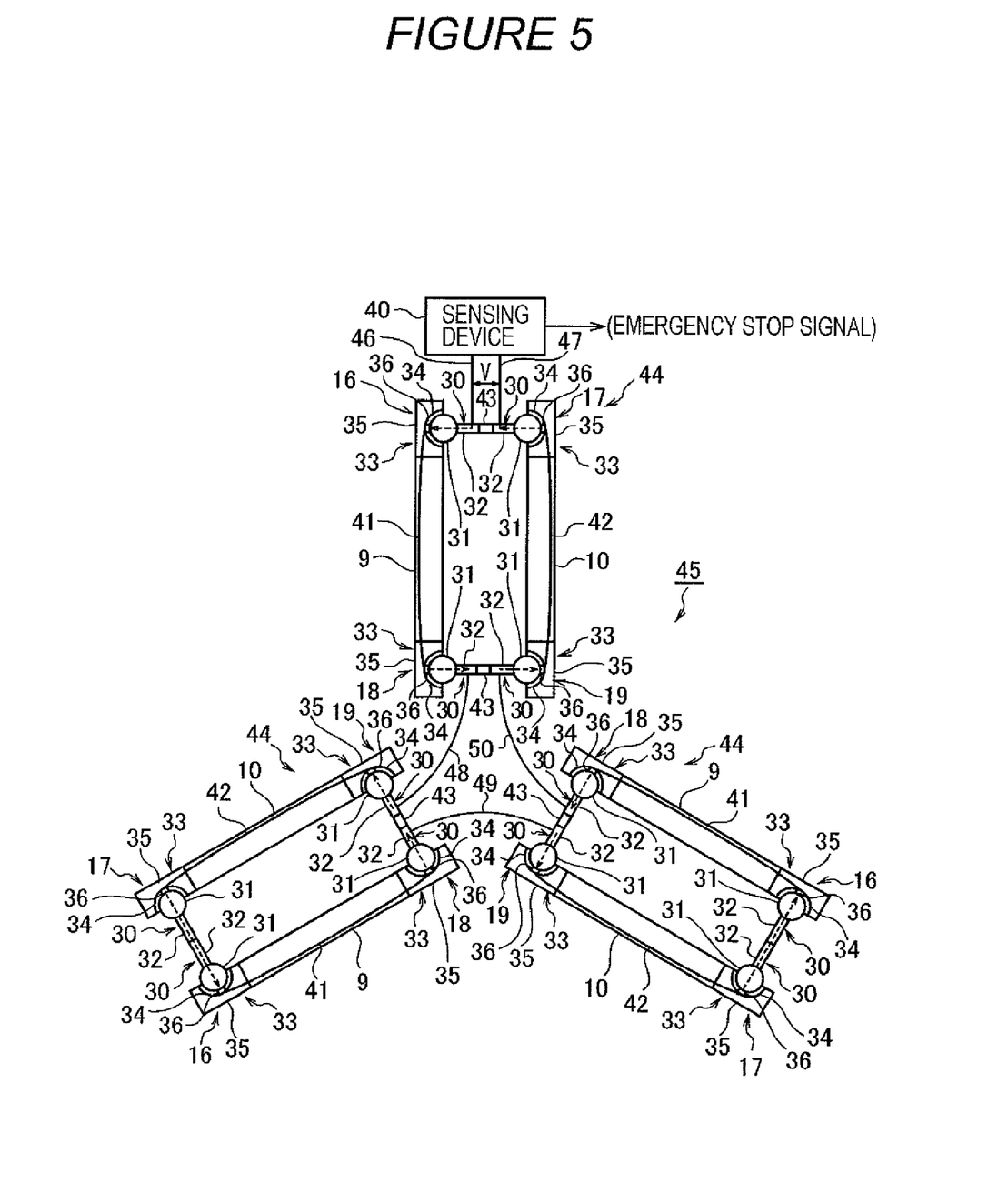
FIG. 5 is a schematic diagram showing an example of an assembled sensing circuit that integrally senses when any of ball joints used in each of three arm main bodies defining the parallel mechanism is loose according to a preferred embodiment of the present invention.

As shown in FIG. 5, in the assembled sensing circuit 45 that integrally senses when any of the total of twelve ball joints 16, 17, 18, 19 used in the three arm main bodies 6 is loose, three above-described assembled sensing circuits 44 are connected together in series through a fifth wiring material 48, a sixth wiring material 49, and a seventh wiring material 50. In this case, to allow the assembled sensing circuits 44 defining the assembled sensing circuit 45 to be connected together in series, the location of the insulator 43 is changed from the one described above. When the bracket 14 is made of a conductive material such as metal, the fifth wiring material 48, the sixth wiring material 49, and the seventh wiring material 50 may be formed by performing pattern wiring on an insulating layer provided on the bracket 14. Where the bracket 14 is made of an insulating material such as resin, the fifth wiring material 48, the sixth wiring material 49, and the seventh wiring material 50 may be formed by performing pattern wiring directly on the bracket 14. This prevents any of the fifth wiring material 48, the sixth wiring material 49, and the seventh wiring material 50 from being caught on the frame or the like and inadvertently cut while the parallel mechanism 1 is in operation.

In the assembled sensing circuit 44 connected to the sensing device 40, the insulator 43 is provided between the ball stud 30 (shaft portion 32) of the ball joint 16 and the ball stud 30 (shaft portion 32) of the ball joint 17, and also the insulator 43 is provided between the ball stud 30 (shaft portion 32) of the ball joint 18 and the ball stud 30 (shaft portion 32) of the ball joint 19. On the other hand, in the assembled sensing circuit 44 not connected to the sensing device 40, the insulator 43 is provided between the ball stud 30 of the ball joint 18 and the ball stud 30 of the ball joint 19, and the ball stud 30 of the ball joint 16 and the ball stud 30 of the ball joint 17 are coupled together. The remaining portion of the configuration of the assembled sensing circuit 44 and the configuration of the sensing device 40 are as described above and will thus not be described below.

In the assembled sensing circuit 45, the three assembled sensing circuits 44 (that is, the twelve unit sensing circuits) are connected together in series. Thus, the assembled sensing circuit 45 is electrically continuous when none of the total of twelve ball joints 16, 17, 18, 19 provided in the three arm main bodies 6 is loose. The assembled sensing circuit 45 becomes electrically discontinuous when at least any one of the ball joints 16, 17, 18, 19 is loose. The connections to the input terminals of the sensing device 40 are not limited to the ball stud 30 (shaft portion 32) of the ball joint 16 and the ball stud 30 (shaft portion 32) of the ball joint 17, as described above.

In the above-described configuration, when any one of the ball joints 16, 17, 18, 19 defining the assembled sensing circuit 45, is loose, the assembled sensing circuit 45 becomes electrically discontinuous. The sensing device 40 thus senses that any of the ball joints 16, 17, 18, 19 is loose. Then, the sensing device 40 preferably outputs the emergency stop signal to the programmable logic controller. The driving of the electric motor 4 is thus stopped to stop the operation of the parallel mechanism 1. On the other hand, when none of the ball joints 16, 17, 18, 19 is loose, the assembled sensing circuit 45 is electrically continuous, and does not output the emergency stop signal. Thus, the electric motor 4 continues to be driven to allow the parallel mechanism 1 to operate.

According to a preferred embodiment of the present invention, the three assembled sensing circuits 44 preferably are connected together in series to define the assembled sensing circuit 45, which integrally senses when any of the total of twelve ball joints 16, 17, 18, 19 used in the three arm main bodies 6 (parallel mechanism 1). Thus, when at least any one of the ball joints 16, 17, 18, 19 defining the assembled sensing circuit 45 is loose, the assembled sensing circuit 45 becomes electrically discontinuous. Therefore, the assembled sensing circuit 45 can integrally sense when at least any one of the total of twelve ball joints 16, 17, 18, 19 used in the three arm main bodies 6 comes loose.

Figure 6:
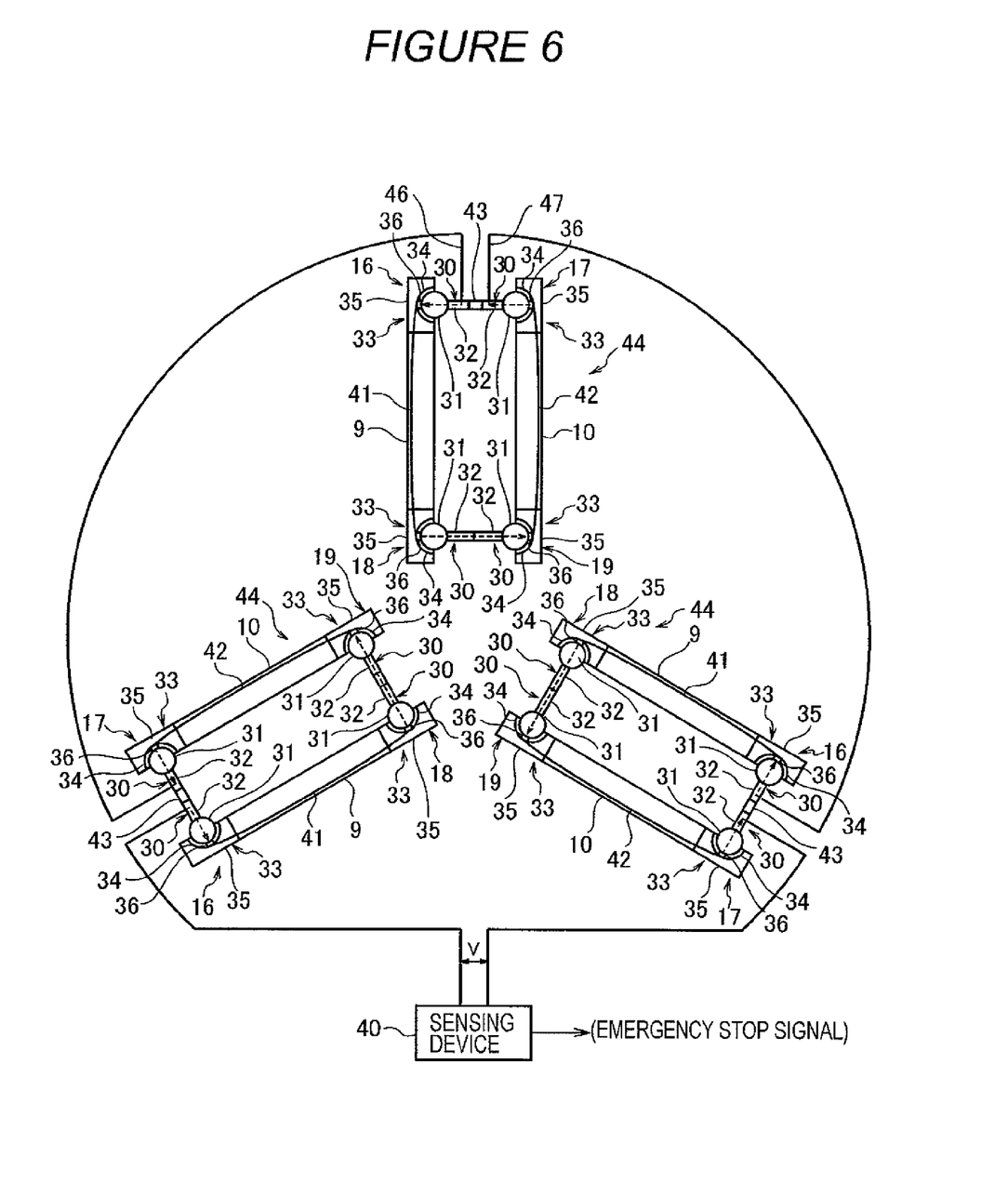
FIG. 6 is a schematic diagram showing an example of an assembled sensing circuit that integrally senses when any of ball joints used in each of three arm main bodies defining the parallel mechanism is loose according to a preferred embodiment of the present invention.

Preferred embodiments of the present invention have been described. However, the present invention is not limited to the above-described preferred embodiments. Many variations may be made to the preferred embodiments. For example, the above-described connection patterns of the assembled sensing circuits 44, 45 are merely illustrative. The present invention is not limited to these connection patterns. For example, as shown in FIG. 6, the assembled sensing circuit may also be configured by sequentially connecting the third wiring material 46 and the fourth wiring material 47 of the other arm main bodies 6 together. Furthermore, in the above-described preferred embodiments, possible loosening of any of the ball joints 16, 17, 18, 19 is integrally sensed for each of the arm main bodies 6 or for all of the three arm main bodies 6. However, possible loosening may be sensed for each of the ball joints. In this case, which of the ball joints 16, 17, 18, 19 are loose can also be determined.

Moreover, the desired assembled sensing circuit may be configured by optionally selecting the unit sensing circuits corresponding to those of the ball joints 16, 17, 18, 19 for which possible loosening is to be sensed, and connecting the unit sensing circuits together in series.

In the above-described preferred embodiments, when the sensing circuit senses that any of the ball joints 16, 17, 18, 19 are loose, the electric motor 4 is stopped. However, an alarm may be used in addition to or instead of the stop of the electric motor 4.

Furthermore, in the above-described preferred embodiments, the flip flop is used to prevent possible chattering. However, input signals may be processed by software.

Figure 4:
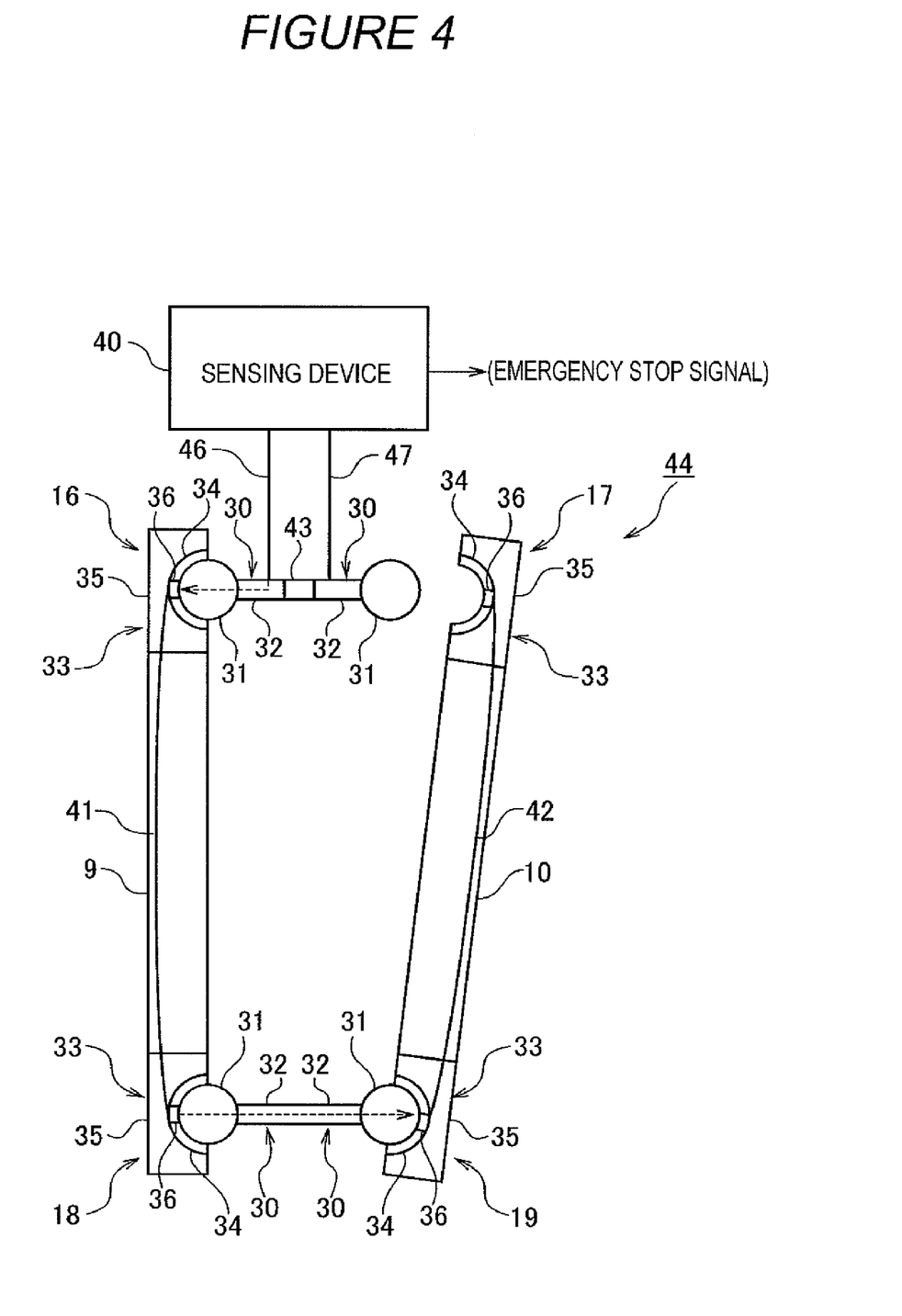
FIG. 4 is a schematic diagram showing how the assembled sensing circuit operates when one of the ball joints comes loose.

In the above-described preferred embodiments, the rod 33 is preferably made of metal. However, the rod 33 may be made of any other material provided that the material is a conductor. For example, the rod 33 may be made of a resin containing carbon. Alternatively, the rod 33 may be an insulator. In this case, the first wiring material 42 and the second wiring material 42 may be connected directly to the conductive member 36 as shown in FIG. 4.

The conductive member 36 may be an electric element, such as, an ordinary metal leaf spring, or a very wear resistant resin that contains carbon or carbon nanotubes and is thus electrically conductive. For example, POM (polyacetal), PEEK (polyether ketone), or the like is preferable in which carbon nanotubes are mixed with PTFE. Moreover, the cup 34 may be a conductive member and integrated with the conductive member 36.

While the present invention has been described with respect to preferred embodiments thereof, it will be apparent to those skilled in the art that the disclosed invention may be modified in numerous ways and may assume many embodiments other than those specifically set out and described above. Accordingly, it is intended by the appended claims to cover all modifications of the present invention that fall within the true spirit and scope of the present invention.

What is claimed is:
1. A parallel mechanism comprising:
a base;
actuators attached to the base;
a plurality of arms coupled together in parallel; wherein
each of the arms includes:
a first link, one end of which is coupled to the actuator;

a second link through which another end of the first link and a bracket are coupled together;

a first ball joint through which one end of the second link and the another end of the first link are swingably coupled together; and a second ball joint through which another end of the second link and the bracket are swingably coupled together;

each of the first and second ball joints includes a ball stud including a ball-shaped head, a socket swingably holding the ball-shaped head of the ball stud, and a conductive member interposed between and in contact with the ball-shaped head and the socket such that the ball stud and the socket are electrically continuous with each other via the conductive member;

a sensing device arranged to sense when at least one of the first and second ball joints is loose, based on whether or not the ball stud and the socket are electrically continuous with each other, such that the sensing device senses that the at least one of the first and second ball joints is loose when the ball stud and the socket are electrically discontinuous with each other.

2. The parallel mechanism according to claim 1, wherein the sensing device is arranged to determine whether the at least one of the first and second ball joints is loose when the at least one of the first and second ball joints remains electrically discontinuous at least for a predetermined period of time.

3. The parallel mechanism according to claim 1, further comprising:

a stop control device arranged to stop a driving of the actuators when the sensing device determines that the at least one of the first and second ball joints is loose.

4. The parallel mechanism according to claim 1, wherein the sensing device is arranged to sense when the at least one of the first and second ball joints is loose, based on whether or not a unit sensing circuit defined by the ball stud, the conductive member, and the socket is electrically continuous.

5. The parallel mechanism according to claim 4, wherein the sensing device is arranged to determine whether the at least one of the first and second ball joints is loose when the at least one of the first and second ball joints remains electrically discontinuous at least for a predetermined period of time.

6. The parallel mechanism according to claim 4, further comprising:

a stop control device arranged to stop a driving of the actuators when the sensing device determines that the at least one of the first and ball joints is loose.

7. The parallel mechanism according to claim 1, wherein the sensing device is arranged to sense when the at least one of the first and second ball joints is loose, based on whether or not an assembled sensing circuit is electrically continuous such that a plurality of unit sensing circuits each defined by a ball stud, a conductive member, and a socket are connected together in series.

8. The parallel mechanism according to claim 7, wherein the second link includes paired rods;

the first ball joint and the second ball joint are provided as a pair in each of the paired rods; and in the assembled sensing circuit, the unit sensing circuits each defined by the two first ball joints and the two second balls joints provided in the second link are electrically connected together in series.

9. The parallel mechanism according to claim 7, wherein the parallel mechanism includes three arms;

the second link includes paired rods;

the first ball joint and the second ball joint are provided as a pair in each of the paired rods; and the unit sensing circuits defined by the six of the first ball joints and the six of the second balls joints provided in the three arms are electrically connected together in series in the assembled sensing circuit.

10. The parallel mechanism according to claim 7, wherein the sensing device determines that the at least one of the first and second ball joints is loose when the at least one of the first and second ball joints remains electrically discontinuous at least for a predetermined period of time.

11. The parallel mechanism according to claim 7, further comprising:

a stop control device arranged to stop a driving of the actuators when the sensing device determines that the at least one of the first and second ball joints is loose.

12. A parallel mechanism comprising:

a plurality of arms coupled together in parallel and each arm including a first link, one end of which is coupled to an actuator attached to a base portion;

a second link through which another end of the first link and a bracket are coupled together;

a first ball joint through which one end of the second link and the another end of the first link are swingably coupled together; and a second ball joint through which another end of the second link and the bracket are swingably coupled together; wherein the parallel mechanism includes a sensing device arranged to sense when at least one of the first and second ball joints is loose;

each of the first and second ball joints includes a ball stud including a ball-shaped head, a socket swingably holding the ball-shaped head of the ball stud, and an electrically conductive member interposed between and in contact with the ball-shaped head and the socket such that the ball stud and the socket are electrically continuous with one another via the conductive member;

the sensing device is arranged to sense when at least one of the first and second ball joints is loose, based on whether or not the ball stud and the socket are electrically continuous with one another, such that the sensing device senses that the at least one of the first and second ball joints is loose when the ball stud and the socket are electrically discontinuous with one another.

13. The parallel mechanism according to claim 12, wherein the sensing device senses when the at least one of the first and second ball joints is loose, based on whether or not a unit sensing circuit defined by the ball stud, the conductive member, and the socket is electrically continuous.

14. The parallel mechanism according to claim 12, wherein the sensing device is arranged to sense when the at least one of the first and second ball joints is loose, based on whether or not an assembled sensing circuit is electrically continuous in which a plurality of unit sensing circuits each defined by a ball stud, a conductive member, and a socket are electrically connected together in series.

15. The parallel mechanism according to claim 14, wherein the second link includes paired rods;

the first ball joint and the second ball joint are provided as a pair in each of the paired rods; and in the assembled sensing circuit, the unit sensing circuits are each defined by the two of the first ball joints and the two of the second ball provided in the second link electrically connected together in series.

16. The parallel mechanism according to claim 14, wherein
the parallel mechanism includes three arms;
the second link includes paired rods;
the first ball joint and the second ball joint are provided as a pair in each of the paired rods; and
in the assembled sensing circuit, the unit sensing circuits defined by the six of the first ball joints and the six of the second ball joints provided in the three arms electrically connected together in series.

17. The parallel mechanism according to claim 12, wherein the sensing device determines that the at least one of the first and second ball joints is loose when the at least one of the first and second ball joints remains electrically discontinuous at least for a predetermined period of time.

18. The parallel mechanism according to claim 12, further comprising a stop control device arranged to stop a driving of the actuators when the sensing device determines that the at least one of the first and second ball joints is loose.

19. A method for sensing when at least one of a plurality of ball joints in a parallel mechanism is loose, wherein
the parallel mechanism comprises a base, actuators attached to the base, and a plurality of arms coupled together in parallel, each of the arms having a first link one end of which is coupled to the actuator, a second link through which another end of the first link and a bracket are coupled together, a first ball joint through which one end of the second link and the another end of the first link are swingably coupled together, and a second ball joint through which another end of the second link and the bracket are swingably coupled together, and each of the first and second ball joints includes a ball stud including a ball-shaped head, a socket swingably holding the ball-shaped head of the ball stud, and a conductive member interposed between and in contact with the ball-shaped head and the socket such that the ball stud and the socket are electrically continuous with each other via the conductive member; and
the method includes a step of sensing when at least one of the first and second ball joints is loose, based on whether or not the ball stud and the socket are electrically continuous with respect to one another such that the sensing unit senses that the at least one of the first and second ball joints is loose when the ball stud and the socket are electrically discontinuous with each other.

20. The method according to claim 19, further comprising a step of stopping driving of the actuators upon determining that the at least one of the first and second ball joints is loose.

* * * * *